US007983513B2

(12) United States Patent
Matsuzawa et al.

(10) Patent No.: US 7,983,513 B2
(45) Date of Patent: Jul. 19, 2011

(54) IMAGE PROCESSING APPARATUS, CONTROL METHOD THEREOF, AND PROGRAM

(75) Inventors: Noriko Matsuzawa, Souka (JP); Atsushi Ikeda, Tokorozawa (JP)

(73) Assignee: Canon Kabushiki Kaisha, Tokyo (JP)

(*) Notice: Subject to any disclaimer, the term of this patent is extended or adjusted under 35 U.S.C. 154(b) by 1093 days.

(21) Appl. No.: 11/695,328

(22) Filed: Apr. 2, 2007

(65) Prior Publication Data
US 2007/0229914 A1   Oct. 4, 2007

(30) Foreign Application Priority Data

Apr. 4, 2006   (JP) .................................. 2006-103629

(51) Int. Cl.
  *G06K 9/54*   (2006.01)
  *G06K 9/68*   (2006.01)
(52) U.S. Cl. ........................ 382/305; 382/218
(58) Field of Classification Search ................ 382/187, 382/190, 209, 218, 305
See application file for complete search history.

(56) References Cited

U.S. PATENT DOCUMENTS

| 6,735,694 B1 * | 5/2004 | Berstis et al. ................. 713/178 |
| 6,854,642 B2 * | 2/2005 | Metcalf et al. ................ 235/375 |
| 7,369,701 B2 * | 5/2008 | Lundberg ...................... 382/181 |
| 7,415,476 B2 * | 8/2008 | Borrowman .......................... 1/1 |
| 2003/0084105 A1 * | 5/2003 | Wiley et al. ................... 709/205 |
| 2006/0168353 A1 * | 7/2006 | Oguri et al. ................... 709/248 |
| 2006/0259527 A1 * | 11/2006 | Devarakonda et al. ........ 707/203 |

FOREIGN PATENT DOCUMENTS

| JP | 2001-117820 | 4/2001 |
| JP | 2003-234985 A | 8/2003 |
| JP | 2004-104674 A | 4/2004 |
| JP | 2005-135211 A | 5/2005 |
| JP | 2006-033728 A | 2/2006 |

OTHER PUBLICATIONS

The above foreign patent documents were cited in a Feb. 18, 2011 Japanese Office Action, which is enclosed without an English Translation, that issued in Japanese Patent Application No. 2006-103629.

* cited by examiner

*Primary Examiner* — Daniel G Mariam
(74) *Attorney, Agent, or Firm* — Cowan, Liebowitz & Latman, P.C.

(57) ABSTRACT

An OCR process is executed for image data read by an image reading unit. First date information in the image data is acquired based on the OCR process result. Current second date information is acquired. The acquired first date information is compared with the second date information. Time stamp information is added to the image data if the comparison result indicates that the difference between the two pieces of date information falls within a predetermined period. The image data is saved at a designated saving destination.

18 Claims, 13 Drawing Sheets

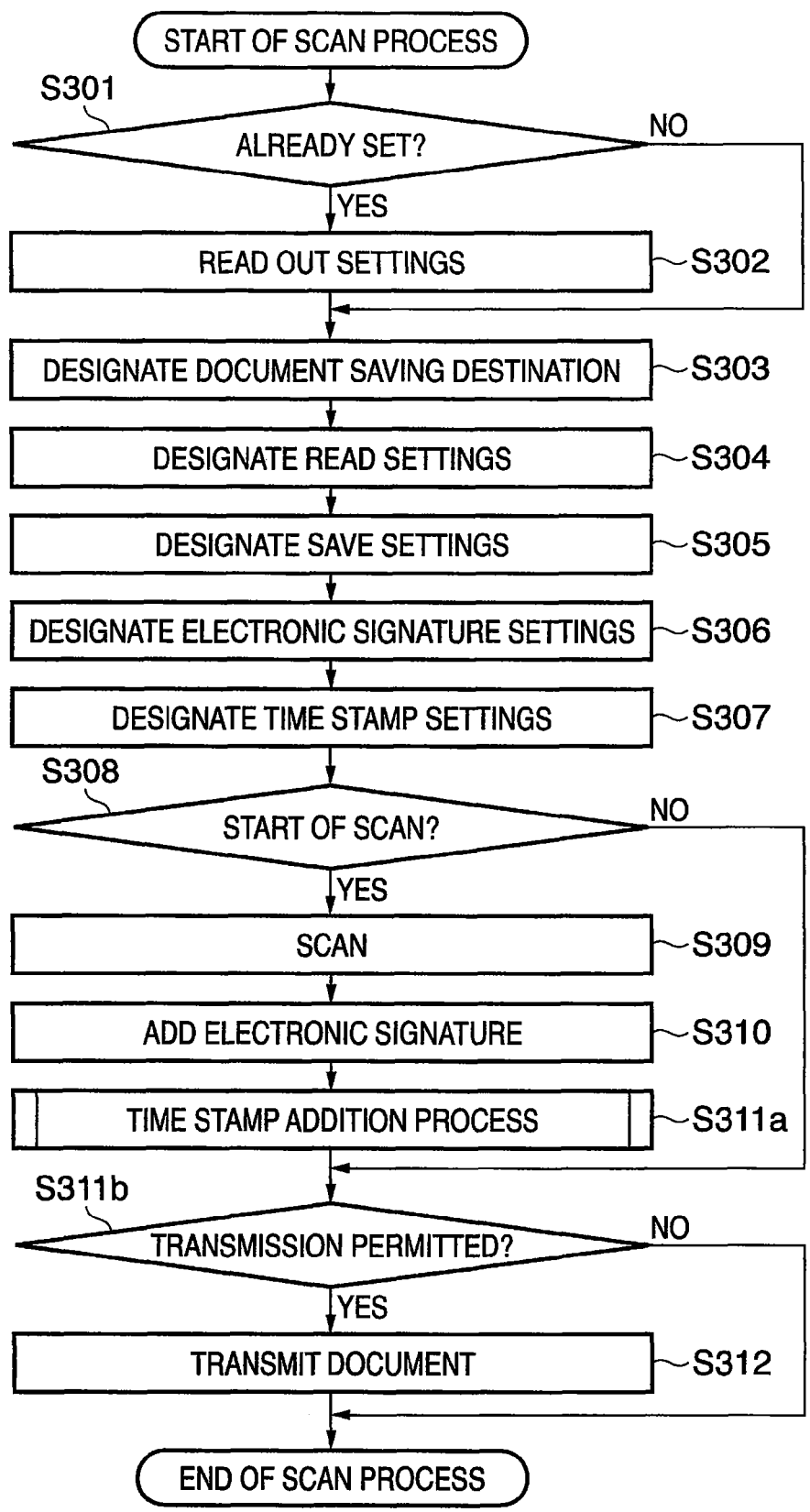

IMAGE PROCESSING APPARATUS, CONTROL METHOD THEREOF, AND PROGRAM

BACKGROUND OF THE INVENTION

1. Field of the Invention

The present invention relates to an image processing apparatus which comprises an image reading unit and manages image data read by the image reading unit, a control method thereof, and a program.

2. Description of the Related Art

As the Electronic Documents Act has come into effect, even digitized documents obtained from paper documents, the large volume of which is flooding offices, are regarded as legally valid if they are saved/managed under predetermined conditions. The "predetermined conditions" change between the government offices. A main condition that is commonly defined is that "a document should be managed by a system capable of: clarifying the responsible person who has digitized the paper document, guaranteeing that the digitized document is not altered, and searching for the document".

Especially, the National Tax Administration Agency strictly applies this condition and also defines a condition that an audit target document such as a receipt should be digitized within a predetermined period from its issue date. There is also a supplementary condition so that the "predetermined period" should be defined on the basis of a flow such as a business flow by the end user company that manages documents.

To comply with this law (ministerial ordinance), systems offered by manufacturers to scan a paper document and save it in a paper document add an electronic signature to image data immediately after scan for paper document digitization. This function clarifies a responsible person who has digitized a paper document. Moreover, addition of a time stamp guarantees absence of alteration.

Generally, every time a time stamp is added, the company that provides the time stamp service charges the end user for it, and the end user pays the charged amount.

A prior art is disclosed in Japanese Patent Laid-Open No. 2001-117820. Japanese Patent Laid-Open No. 2001-117820 has as its object to provide a method and apparatus for more safely managing the original of an important digitized document. In Japanese Patent Laid-Open No. 2001-117820, upon registering a document, registration certificate information is generated on the basis of electronic information such as a time stamp, device ID, and document ID. This allows to uniquely identify the document. Management/usage of documents is done by, e.g., updating the time stamp information of a document moved from another PC. In Japanese Patent Laid-Open No. 2001-117820, therefore, it is necessary to always add a time stamp upon document registration.

Every time a time stamp is added to guarantee the absence of alteration, the user is charged. However, if an audit target document is digitized after the elapse of the "predetermined period" from the issue date of the document, no legal validity is recognized regardless of a fee-charging time stamp, especially in the National Tax Administration Agency. In this case, there is (generally) no point in adding the fee-charging time stamp.

Some end users may want to always add a time stamp to guarantee the absence of alteration from the viewpoint of management rules of the company. Hence, the system preferably copes with both cases.

If the digitized document of an audit target has no legal validity, the company must also preserve its original paper document and present it at the time of audit. For this purpose, double management is required to manage digitized documents in the storage server and paper documents, resulting in cumbersome management.

If an enormous number of digitized documents exist, the system is preferably able to easily search for an audit target document to save time and effort in audit.

SUMMARY OF THE INVENTION

The present invention has been made to solve the above-described problems, and has as its object to provide an image processing apparatus capable of efficiently and safely executing operations related to management of electronic documents obtained by digitizing paper documents, a control method thereof, and a program.

According to first aspect of the present invention, an image processing apparatus which manages image data read by an image reading unit, comprises:

first acquisition means for executing an OCR process for the image data read by the image reading unit and acquiring first date information in the image data on the basis of the OCR process result;

second acquisition means for acquiring current second date information;

comparison means for comparing the first date information obtained by the first acquisition means with the second date information obtained by the second acquisition means;

addition means for adding time stamp information to the image data if a comparison result of the comparison means indicates that a difference between the first date information and the second date information falls within a predetermined period; and saving means for saving the image data in a designated saving destination device.

In a preferred embodiment, the apparatus further comprises display means for displaying, on a display unit, a confirmation window to confirm whether to add a time stamp if the comparison result of the comparison means indicates that the difference between the first date information and the second date information does not fall within the predetermined period.

In a preferred embodiment, if the first acquisition means has failed in acquiring the first date information, the display means displays, on the display unit, a confirmation window including display to indicate the failure and a control to instruct whether to add a time stamp.

In a preferred embodiment, when a user gives the instruction to add the time stamp by the confirmation window, the addition means adds the time stamp information to the image data.

In a preferred embodiment, the display means further displays, on the display unit, an input window for inputting a management number for managing the image data, and the saving means saves, in the designated saving destination device, the management number input via the input window in correspondence with the image data.

In a preferred embodiment, when a user gives the instruction not to add the time stamp by the confirmation window, the saving means saves the image data without any time stamp in the saving destination device.

In a preferred embodiment, the saving means controls to save, in the saving destination device, information obtained by comparison calculation of the first date information and the time stamp information as information for searching of the image data.

According to a second aspect of the present invention, an image processing apparatus which manages image data read by an image reading unit, comprises:

first acquisition means for executing an OCR process for the image data read by the image reading unit and acquiring date information in the image data on the basis of the OCR process result;

second acquisition means for acquiring time stamp information;

comparison means for comparing the date information obtained by the first acquisition means with the time stamp information obtained by the second acquisition means;

addition means for adding time stamp information to the image data if a comparison result of the comparison means indicates that a difference between the date information and the time stamp information falls within a predetermined period; and saving means for saving the image data in a designated saving destination device.

In a preferred embodiment, the apparatus further comprises display means for displaying, on a display unit, a confirmation window to confirm whether to add a time stamp if the comparison result of the comparison means indicates that the difference between the date information and the time stamp information does not fall within the predetermined period.

In a preferred embodiment, if the comparison result of the comparison means indicates that the difference between the date information and the time stamp information does not fall within the predetermined period, the display means displays, on the display unit, a confirmation window including display to indicate the comparison result and a control to confirm whether to add a time stamp.

In a preferred embodiment, if the first acquisition means has failed in acquiring the date information, the display means displays, on the display unit, an input window including a control to input date information.

In a preferred embodiment, if the comparison result of the comparison means indicates that the date information is later than the time stamp information, the display means displays, on the display unit, a confirmation window indicating that the date information is invalid.

In a preferred embodiment, the apparatus further comprises setting means for setting a flag to inhibit saving of the image data if it is determined on the basis of the comparison result of the comparison means that the date information is invalid.

In a preferred embodiment, the saving means controls to save, in the saving destination device, information obtained by comparison calculation of the date information and the time stamp information as information for searching of the image data.

According to a third aspect of the present invention, a control method of an image processing apparatus which manages image data read by an image reading unit, comprises:

a first acquisition step of executing an OCR process for the image data read by the image reading unit and acquiring first date information in the image data on the basis of the OCR process result;

a second acquisition step of acquiring current second date information;

a comparison step of comparing the first date information obtained in the first acquisition step with the second date information obtained in the second acquisition step;

an addition step of adding time stamp information to the image data if a comparison result of the comparison step indicates that a difference between the first date information and the second date information falls within a predetermined period; and a saving step of saving the image data in a designated saving destination device.

According to a fourth aspect of the present invention, a control method of an image processing apparatus which manages image-data read by an image reading unit, comprises:

a first acquisition step of executing an OCR process for the image data read by the image reading unit and acquiring date information in the image data on the basis of the OCR process result;

a second acquisition step of acquiring time stamp information;

a comparison step of comparing the date information obtained in the first acquisition step with the time stamp information obtained in the second acquisition step;

an addition step of adding time stamp information to the image data if a comparison result of the comparison step indicates that a difference between the date information and the time stamp information falls within a predetermined period; and a saving step of saving the image data in a designated saving destination device.

According to fifth aspect of the present invention, a computer program stored in a computer-readable medium to cause a computer to control an image processing apparatus which manages image data read by an image reading unit, comprising:

a first acquisition step of executing an OCR process for the image data read by the image reading unit and acquiring first date information in the image data on the basis of the OCR process result;

a second acquisition step of acquiring current second date information;

a comparison step of comparing the first date information obtained in the first acquisition step with the second date information obtained in the second acquisition step;

an addition step of adding time stamp information to the image data if a comparison result of the comparison step indicates that a difference between the first date information and the second date information falls within a predetermined period; and a saving step of saving the image data in a designated saving destination device.

According to a sixth aspect of the present invention, a computer program stored in a computer-readable medium to cause a computer to control an image processing apparatus which manages image data read by an image reading unit, comprises:

a first acquisition step of executing an OCR process for the image data read by the image reading unit and acquiring date information in the image data on the basis of the OCR process result;

a second acquisition step of acquiring time stamp information;

a comparison step of comparing the date information obtained in the first acquisition step with the time stamp information obtained in the second acquisition step;

an addition step of adding time stamp information to the image data if a comparison result of the comparison step indicates that a difference between the date information and the time stamp information falls within a predetermined period; and a saving step of saving the image data in a designated saving destination device.

Further features of the present invention will become apparent from the following description of exemplary embodiments with reference to the attached drawings.

BRIEF DESCRIPTION OF THE DRAWINGS

FIG. 7 is a flowchart showing details of a scan process in step S1022 of the second embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
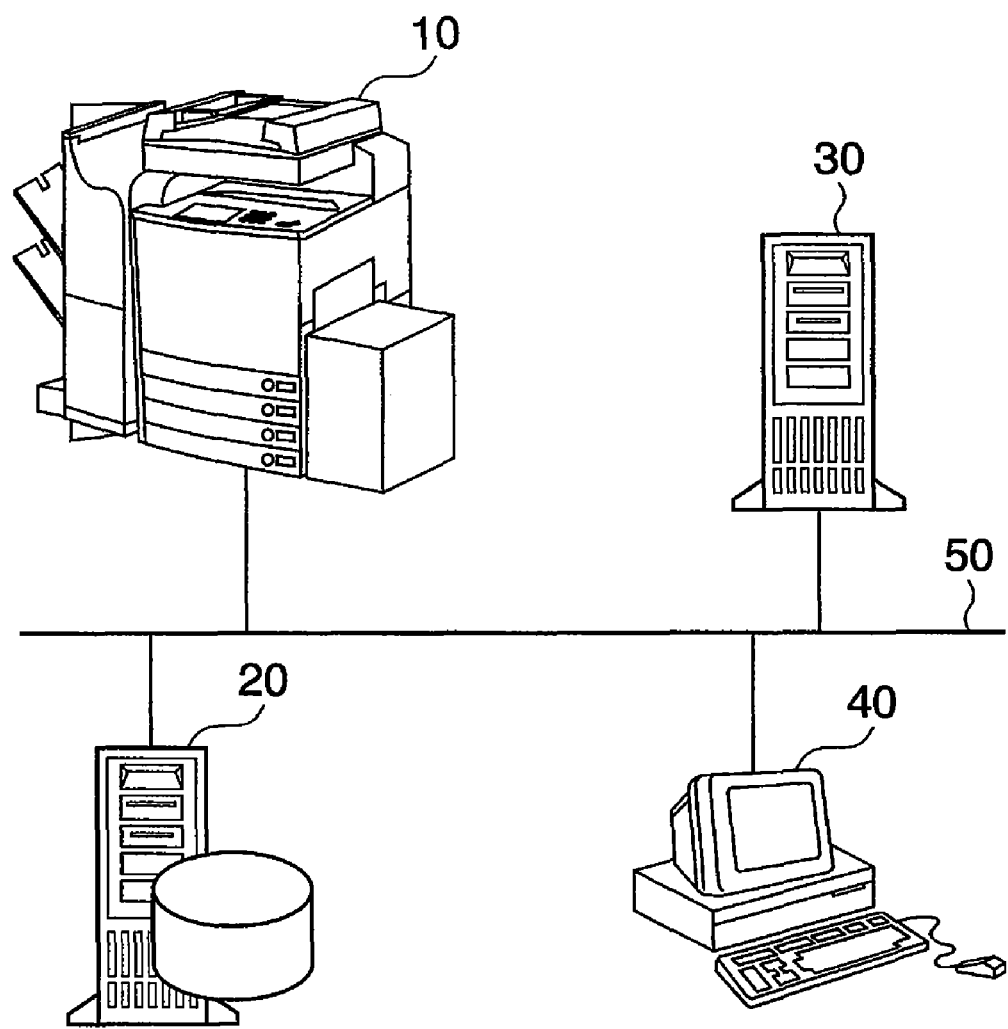
FIG. 1 is a view showing the system configuration of a document registration system according to the first embodiment of the present invention.

FIG. 1 is a view showing the system configuration of a document registration system according to the first embodiment of the present invention.

An MFP device (multi function peripheral and MEAP device also have the same meaning) 10 having an application execution function connects to a storage server 20 via a network 50.

A time stamp service server (complying with RFC3136) 30 capable of providing a time stamp function in cooperation with the MFP device 10 also connects to the network 50. A storage server client 40 which executes operations such as search, reference, edit, and deletion of an electronic document in cooperation with the storage server 20 also connects to the network 50.

In the first embodiment to be described below, the constituent elements are connected via the network (LAN). However, they may be connected via the Internet. Each constituent element includes a single device, but a plurality of devices may be included in each element.

"MFP" is short for Multi Function Peripheral which implements a plurality of kinds of functions such as a print function, copy function, fax function, and data management function. "MEAP" is short for Multifunctional Embedded Application Platform. The MEAP is an application program execution environment based on Java® developed by Sun Microsystems. This enables to add a function to the MFP by installing an application program developed on the basis of client's demands in the MFP via the network.

The arrangement of the MFP device 10 will be described next with reference to FIG. 2.

Figure 2:
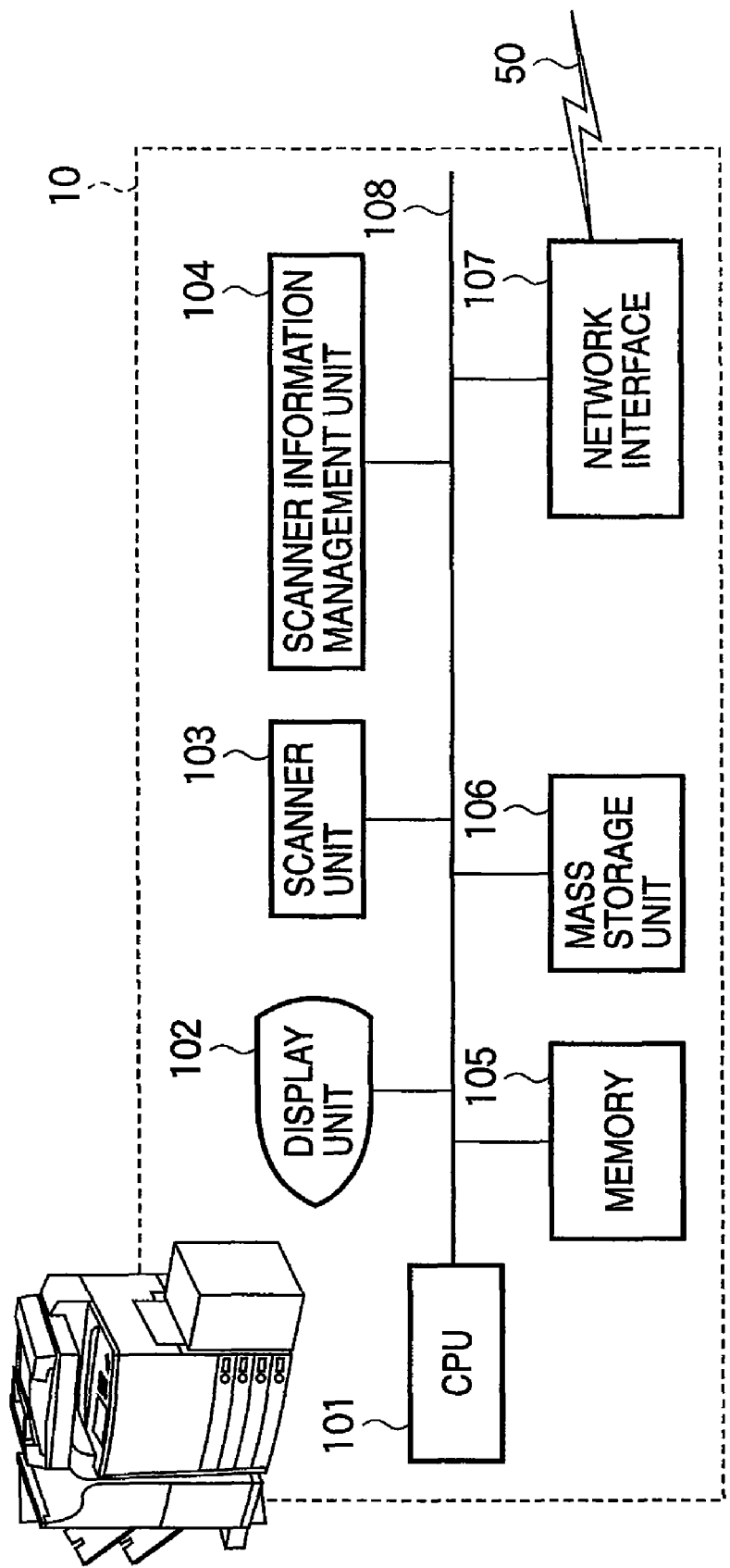
FIG. 2 is a block diagram showing an example of an MFP device that implements the document registration system according to the first embodiment of the present invention.

FIG. 2 is a block diagram showing an example of an MFP device that implements the document registration system according to the first embodiment of the present invention.

A CPU 101 in FIG. 2 connects functions/devices to be described later via an internal bus 108 and controls the MFP device 10. A display unit 102 comprises a display device and an operation unit including a touch panel, keys, and buttons. The display unit 102 displays an operation window generated by an application so that the user can execute an operation via the operation window to do a desired action.

A scanner unit 103 is a device which has an auto document feeder function and reads a document. A scanner information management unit 104 manages/holds the information of the function/state of the scanner unit 103.

A memory 105 stores various kinds of instructions (application programs) to be executed by the CPU 101 to control the MFP device 10. The memory 105 includes, e.g., a RAM and a ROM. A mass storage unit 106 saves images read by the scanner unit 103 and stores various kinds of control programs. A network interface 107 transmits/receives signals via the network 50 under the control of the CPU 101.

The outline of the process of the document registration system according to the first embodiment will be described below with reference to FIGS. 1 to 3.

Figure 3:
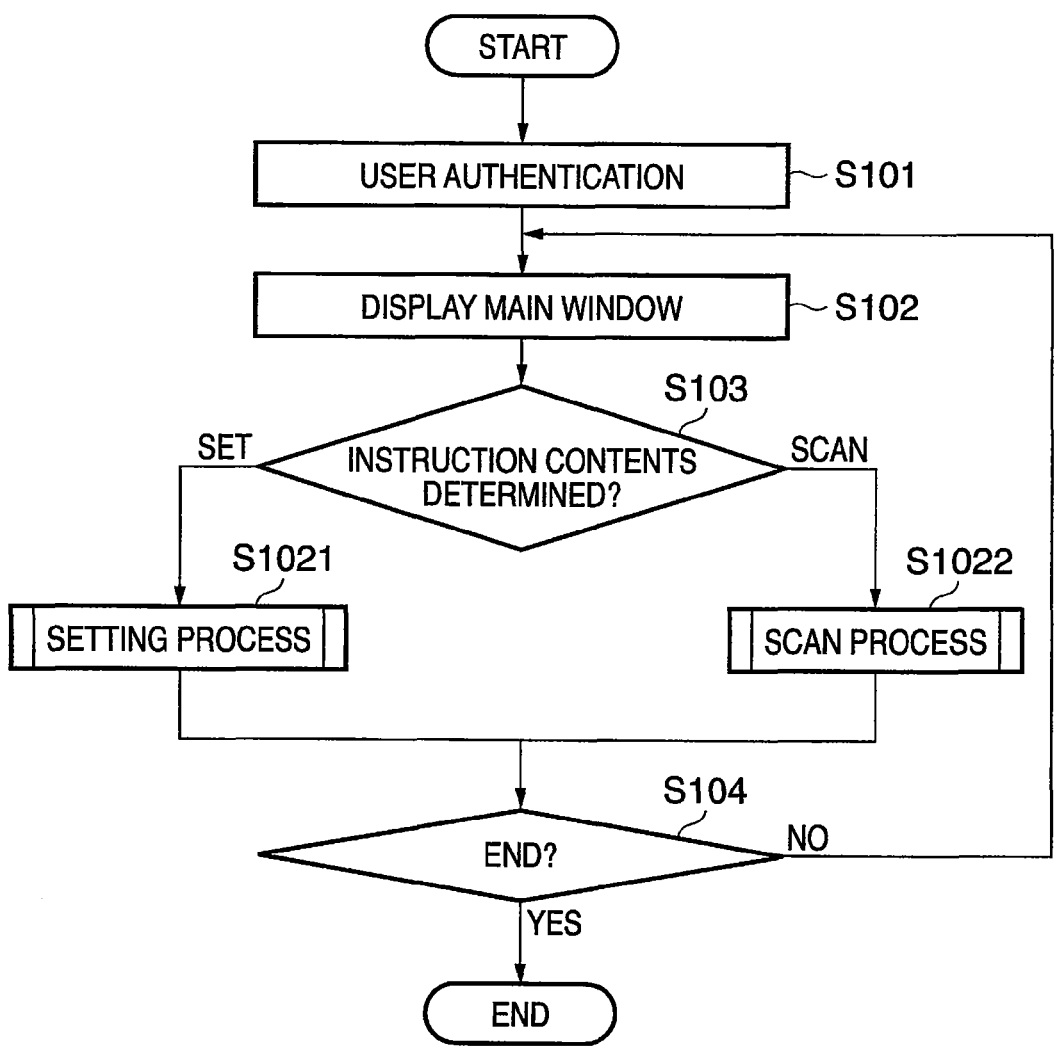
FIG. 3 is a flowchart showing the process operation of the document registration system according to the first embodiment of the present invention.

FIG. 3 is a flowchart showing the process operation of the document registration system according to the first embodiment of the present invention.

This is a process operation of causing the user to do a scan process and transmit/register image data obtained by scan to/in the storage server 20 via the MFP device 10. The user executes a setting process related to document registration in advance. The display unit 102 displays the set contents so that the user can easily scan a document in accordance with the set contents. The prior setting process is not always necessary. The series of document registration processes is also possible by causing the user to do settings upon every scan.

In step S101, the MFP device 10 receives a login process by the user and executes user authentication. For this user authentication, a user authentication function must be executed on the MFP device 10, though it is not always indispensable.

An application is activated by using the display unit 102. The mass storage unit 106 saves the application. The CPU 101 expands the application to an executable form on the memory 105 and displays the main window of the application on the display unit 102.

In step S102, the activated application displays the main window. The user can input an execution instruction of the setting process or scan process via the main window.

In step S103, the instruction contents are determined. If the instruction contents indicate the setting process, the setting process is executed in step S1021. This will be described in detail with reference to FIG. 4. If the instruction contents indicate the scan process, the scan process is executed in step S1022. This will be described in detail with reference to FIG. 5.

In step S104, after the end of the setting process or scan process, it is confirmed on the basis of the operation on the display unit 102 whether to end the process. If the process is not to be terminated (NO in step S104), the process returns to step S102. If the process is to be terminated (YES in step S104), the process ends.

The process in step S104 allows to continuously execute the setting process or scan process. However, this process is not always necessary. When the setting process or scan process is ended, the application may automatically finish.

The setting process in step S1021 will be described next in detail with reference to FIG. 4.

[Setting Process]

Figure 4:
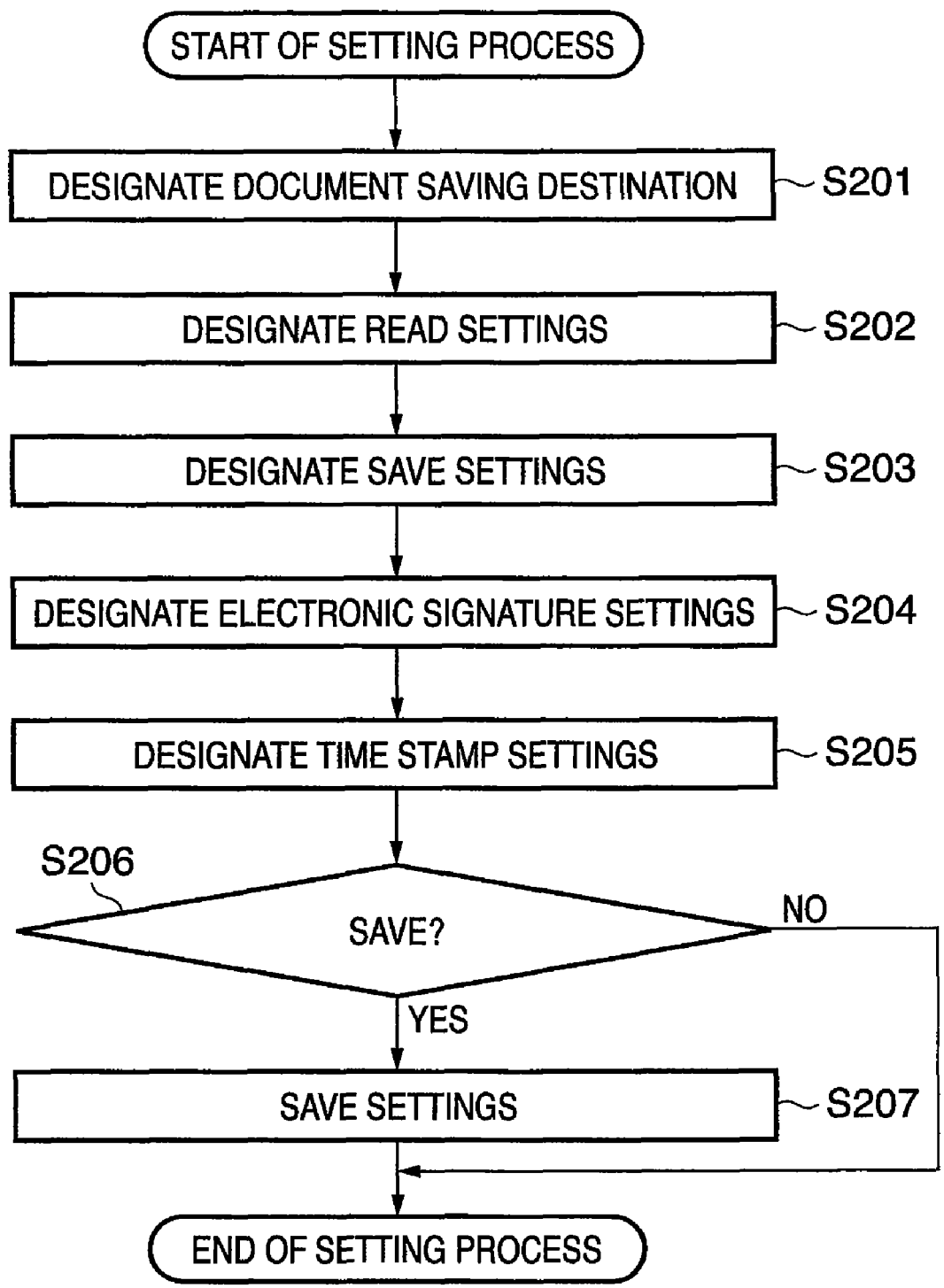
FIG. 4 is a flowchart showing details of a setting process in step S1021 of the first embodiment of the present invention.

FIG. 4 is a flowchart showing details of the setting process in step S1021 of the first embodiment of the present invention.

In executing the setting process, the display unit 102 displays a setting window for various kinds of settings to be described below so that the user can do the various settings via the setting window.

In step S201, the saving destination of a digitized document (to be referred to as an electronic document hereinafter) is designated on the basis of a user operation. To designate the saving destination, the application acquires, from the storage server 20, saving destination information indicating cabinets/folders serving as the saving destination. The display unit 102 displays the saving destination information so that the user can designate a desired saving destination.

To do this, it is necessary to prepare the environment by executing access settings (e.g., designation of an IP address or URL) for the storage server 20 in advance. The access environment can be set on, e.g., the main window displayed in step S102 upon activating the application.

More specifically, the user inputs access information to the storage server 20. The CPU 101 attempts to establish connection to the storage server 20 via the network interface 107. If the connection establishment has succeeded, the access information is correct, and the storage server 20 is disconnected. If connection establishment has failed, the user inputs the access information again.

In the first embodiment, no communication means is particularly designated. A communication protocol such as HTTP, SOAP, or TCP/IP is usable. Any means can be used if the application can communicate with the storage server 20.

In step S202, read settings to read a document are designated on the basis of a user operation. Examples of set contents are the color mode, resolution, file format, double-sided mode, document size, and scaling.

In step S203, save settings for saving image data are designated on the basis of a user operation. Examples of set contents are document properties such as the document name, file format, and index.

In step S204, whether to add an electronic signature to image data is decided on the basis of a user operation. To add an electronic signature, a certificate to be used for the electronic signature is designated.

In step S205, whether to add a time stamp to image data is designated on the basis of a user operation. In this case, a period (a predetermined period from issue of an audit target document to digitization, which is defined by, e.g., the company) during which the legal validity of the time stamp is recognized is designated.

In addition, whether to display an inquiry window (FIG. 6B) on the display unit 102 to inquire of the user about time stamp addition in case of the lapse of the predetermined period is set. If the predetermined period has elapsed, and setting has been done to inhibit display of the inquiry window, the time stamp process is automatically skipped (step S406 in FIG. 6A).

For an OCR process to acquire date information from image data, a target area of the OCR process may be designated.

In step S206, the user confirms the various settings in steps S201 to S205 and designates whether to save the settings on the basis of a user operation. To save the settings (YES in step S206), the process advances to step S207. The application saves the various set contents in the mass storage unit 106. Any saving format such as a file is usable if it allows the application to read and write. If the settings are not to be saved (NO in step S206), the process is ended.

The scan process in step S1022 will be described next in detail with reference to FIG. 5.

[Scan Process]

Figure 5:
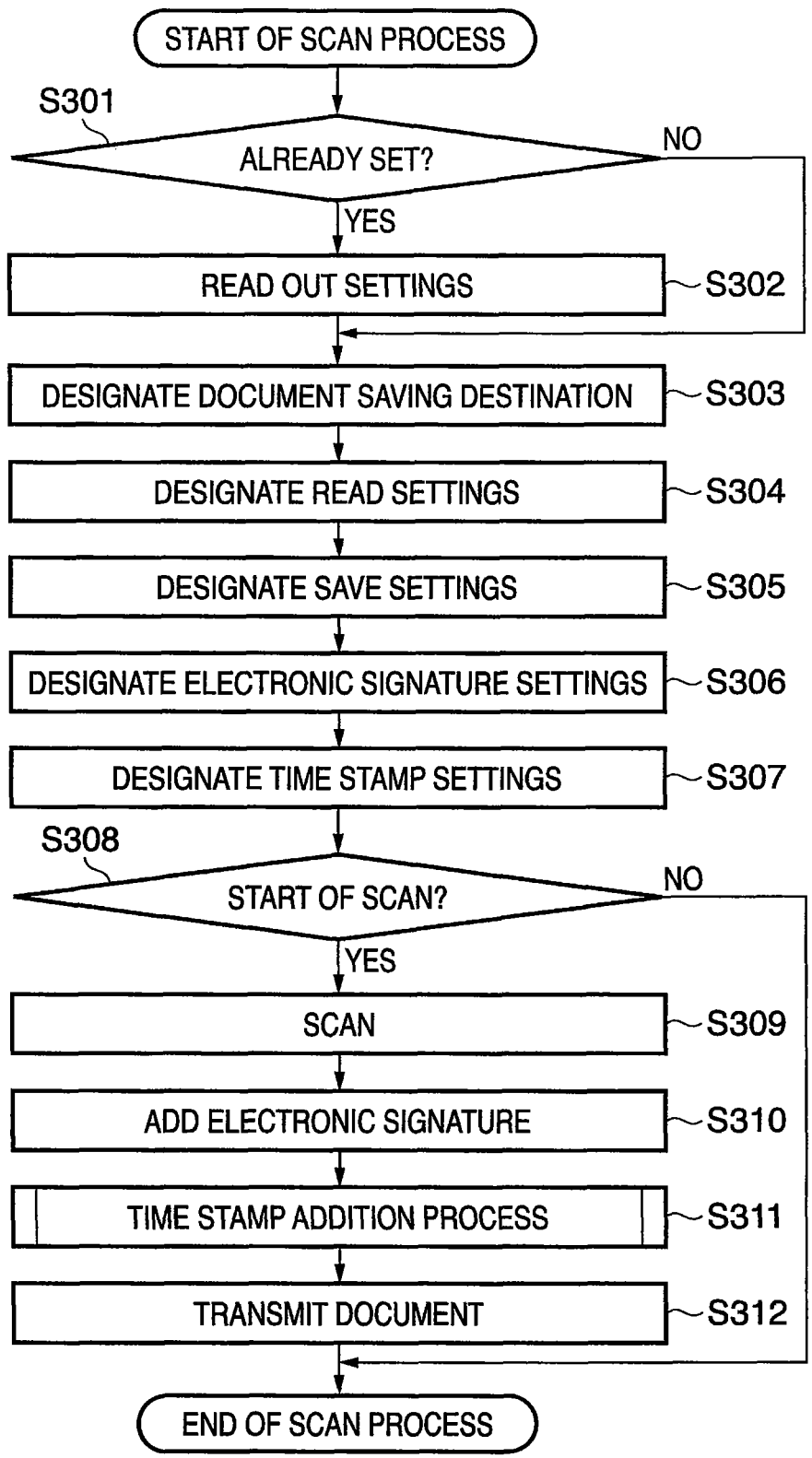
FIG. 5 is a flowchart showing details of a scan process in step S1022 of the first embodiment of the present invention.

FIG. 5 is a flowchart showing details of the scan process in step S1022 of the first embodiment of the present invention.

In executing the scan process, the display unit 102 displays a scan setting window for scan and various kinds of settings to be described below so that the user can do the various settings via the scan setting window.

In step S301, it is confirmed whether the user has already done the settings. If the settings have already been done (YES in step S301), the process advances to step S302 to read out the settings stored in the mass storage unit 106. The settings are displayed on the screen as default values for the process in steps S303 to S307.

In the first embodiment, the process advances from step S302 to step S303 to confirm and change the set values. However, the process may advance directly from step S302 to step S308, assuming the values are already set in step S303 to S307.

If the settings are not done in step S301 (NO in step S301), the process advances to step S303 to do settings on the basis of a user operation.

The processes in step S303 to S307 are the same as those in steps S201 to S205 in FIG. 4, and a description thereof will be omitted.

In step S308, the user confirms the various settings in steps S301 to S307 and designates on the basis of a user operation whether to start scan. If a scan start instruction is input (YES in step S308), the process advances to step S309. Otherwise (NO in step S308), the process is ended. Before the end of the process, the display unit 102 may display an end confirmation window. If the user designates not to end the process on the end confirmation window, the process may return to step S303 to change the settings.

In step S309, the application executes scan in accordance with the settings designated in step S304 and acquires image data. The image data is temporarily saved in the mass storage unit 106.

In step S310, the application adds an electronic signature to the image data temporarily saved in the mass storage unit 106 if electronic signature addition is set in step S306. The electronic signature addition process and the certificate are known techniques, and a description thereof will be omitted.

In step S311, the time stamp addition process is executed for the image data with the electronic signature added in step S310. This will be described in detail with reference to FIG. 6A.

In step S312, the application transmits the image data processed in step S311 to the storage server 20 together with the saving destination information indicating the saving destination in accordance with the settings designated in step S305. The storage server 20 receives the image data and saves it at the saving destination indicated by the saving destination information. This is a known technique, and a description thereof will be omitted.

The time stamp addition process in step S311 will be described next with reference to FIG. 6A.

[Time Stamp Addition Process]

Figure 6A:
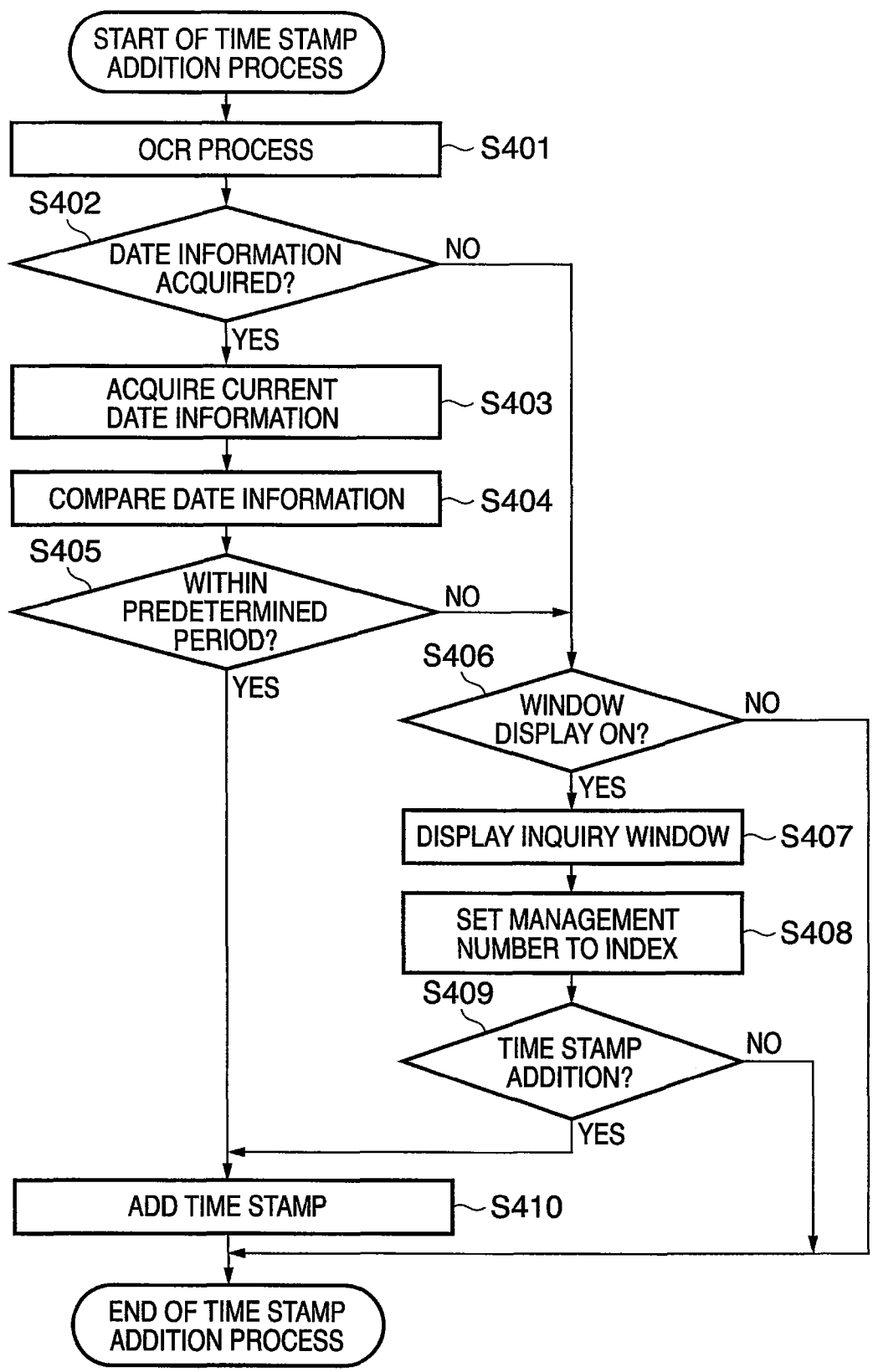
FIG. 6A is a flowchart showing details of a time stamp addition process in step S311 of the first embodiment of the present invention.

FIG. 6A is a flowchart showing details of the time stamp addition process in step S311 of the first embodiment of the present invention.

In step S401, the OCR process is executed for target image data to acquire date information in the image data. If the target area of the OCR process is designated in step S205, the process is done on the basis of the target. The OCR process is a known technique, and a description thereof will be omitted. The date information may contain not only the year/month/day but also time.

In step S402, it is determined whether the date information is properly acquired in step S401. If it is determined that the information is properly acquired (YES in step S402), the process advances to step S403. If the information is not properly acquired (NO in step S402), the process advances to step S406.

In step S403, the application acquires current date information from the internal clock (not shown) of the MFP device 10. In the first embodiment, the internal clock of the MFP device 10 is used. However, the date information may be acquired from another device. In step S404, the date information acquired in step S401 is compared with that acquired in step S403.

In step S405, it is determined on the basis of the comparison result whether the difference between the two pieces of date information is equal to or smaller than the predetermined period set in step S205 in FIG. 4. If the difference is equal to or smaller than the predetermined period (YES in step S405), the process advances to step S410. Otherwise (NO in step S405), the process advances to step S406.

In step S406, whether the setting is done to display an inquiry window on the display unit 102 (the setting done in step S205 in FIG. 4 or in step S307 in FIG. 5) is determined. If it is determined that the setting to validate display of the inquiry window is done (YES in step S406) the process advances to step S407. If it is determined that the setting to invalidate display of the inquiry window is done (NO in step S406), the process is ended.

Figure 6B:
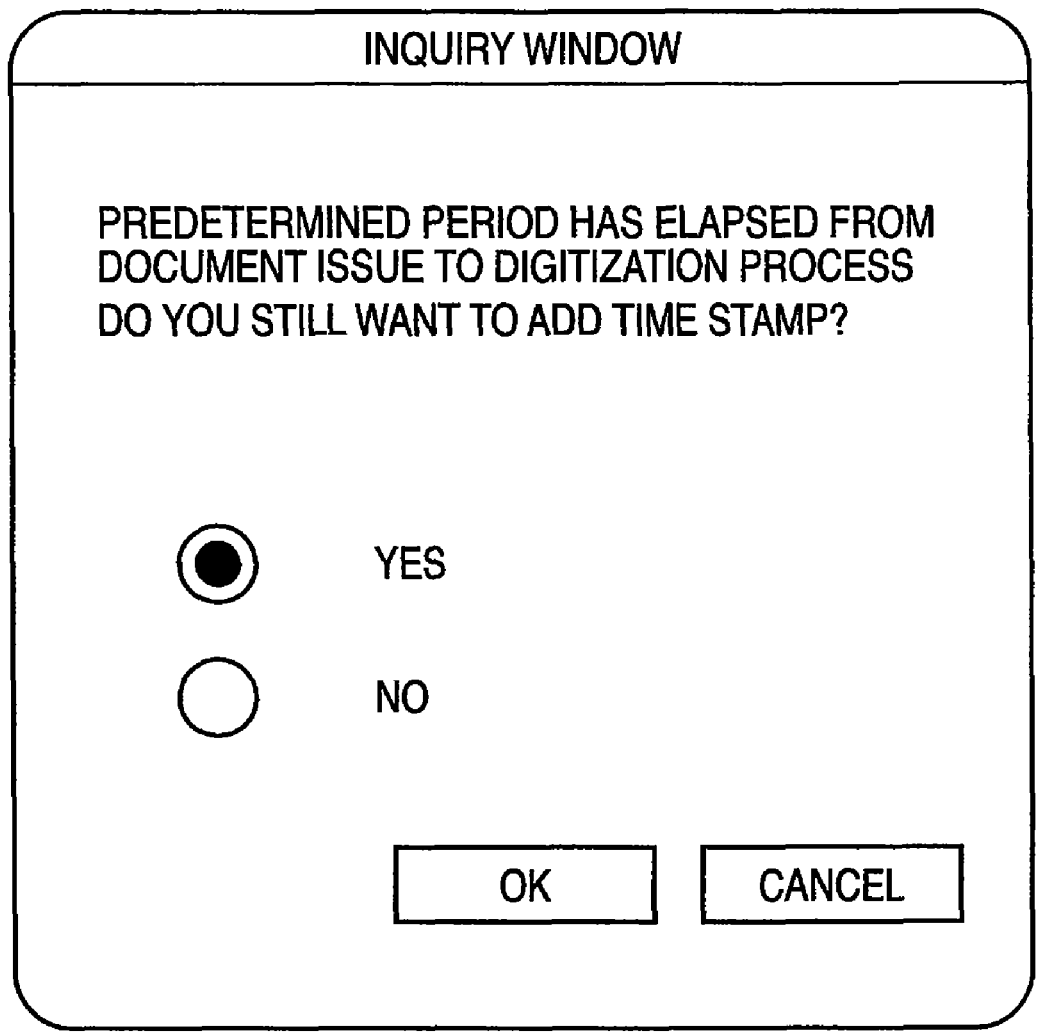
FIG. 6B is a view showing an example of an inquiry window according to the first embodiment of the present invention.

In step S407, the display unit 102 displays the inquiry window (FIG. 6B) to ask the user whether to add a time stamp. If it is determined in step S405 that the time difference exceeds the predetermined period, the inquiry window simultaneously notifies the user that the time from the document issue to the digitization process has exceeded the predetermined period. At the same time, a control (radio buttons) to make the user designate whether to add a time stamp even in this state is displayed, as shown in FIG. 6B.

By referring to this inquiry window, the user can recognize that the predetermined period has elapsed from the document issue to the digitization process and designate whether to add a time stamp yet.

If it is determined in step S402 that the date information is not acquired, the inquiry window displayed in step S407 is preferably designed to simultaneously notify the user that "there is a possibility that the predetermined period has elapsed because no date information can be acquired".

The control to add a time stamp includes radio buttons. This is merely an example, and any other control such as a check box or a menu can be used.

If time stamp addition is designated, the designation contents are stored in the mass storage unit 106.

In step S408, the display unit 102 displays a document management number input window. The user can arbitrarily input a management number for the image data of the read document in the management number input window. If a management number is input, the designated management number is set in the document properties (more specifically, e.g., index) of the image data. Internally, this process may be executed by adding a set item to the save settings in step S203 in FIG. 4. Preferably, a management number is assigned by the same management system as that for preserving the document itself to make electronic data saved in the storage server 20 correspond to the physical document.

When the document properties are set in this way, the storage server 20 can manage the image data together with the document properties. Hence, it is possible to search for the image data on the basis of the document properties as needed.

In step S409, it is determined whether the user has designated time stamp addition in step S4(7. If designation is done to add a time stamp (YES in step S409), the process advances to step S410. If designation is done not to add a time stamp (NO in step S409), the process is ended.

In step S410, the application accesses the time stamp service server 30 and adds a time stamp. As for the access settings to the time stamp service server 30, the application may hold the access information in advance. Alternatively, the user may set the information (e.g., in step S205 in FIG. 4). The process of adding a time stamp to image data is a known technique, and a description thereof will be omitted.

As described above, according to the first embodiment, the system can determine the legal validity upon digitizing a paper document even when the user is not aware of it. In addition, the user can designate whether to add a time stamp to a document without legal validity.

Even when the company must preserve an original paper document separately from an electronic document because it has no legal validity, the electronic document and original can be made to associate with each other in the storage server by assigning management numbers based on a common management system. Hence, the user can easily search for an electronic document by using the search function of the storage server and then search for a corresponding paper document on the basis of the associated management number. That is, consistent management can be done.

Second Embodiment

The user may want to add a time stamp to all electronic documents independently of the presence/absence of legal validity (e.g., to use them for management in the office).

However, as described above, the legal validity of a time stamp to guarantee the absence of alteration may be denied if the audit target document is digitized after the elapse of a "predetermined period" from the issue date of the document. In this case, it is necessary to preserve the original. However, if the system unconditionally adds a time stamp and saves the document in the storage server without displaying the inquiry window, the user may discard the original without knowing the possibility of denial of legal validity.

In addition, if the system unconditionally adds a time stamp to all documents and saves them in the storage server, even an audit target document such as a receipt with a clerical error in its issue date (e.g., when the issue date of an electronic document is later than the date indicated by the time stamp) may be saved in the storage server.

In the second embodiment, if a paper document whose legal validity may be denied because of the lapse of the predetermined period is to be digitized and added with a time stamp, the user is notified of it. An arrangement for thus preventing discard of originals as much as possible will be described.

If a paper document issue date is obviously inconsistent with a date indicated by a time stamp, time stamp addition to the electronic document and saving in the storage server are prevented. An arrangement for this will be described.

The difference from the first embodiment will mainly be explained below.

[Scan Process]

FIG. 7 is a flowchart showing details of a scan process in step S1022 of the second embodiment of the present invention.

The same step numbers as in the flowchart of FIG. 5 of the first embodiment denote the same processes in FIG. 7, and a detailed description thereof will be omitted.

In step S311a, a time stamp is added to image data added with an electronic signature in step S310. This will be described in detail with reference to FIG. 8A.

In step S311b, it is determined on the basis of the process result (return value) in step S311a whether the process target image data can be transmitted to a storage server 20. To permit transmission of the process target image data to the storage server 20 (YES in step S311b), the process advances to step S312. To inhibit transmission of the process target image data to the storage server 20 (NO in step S311b), step S312 is skipped, and the process is ended.

The time stamp addition process in step S311a will be described next with reference to FIG. 8A.

[Time Stamp Addition Process]

Figure 8A:
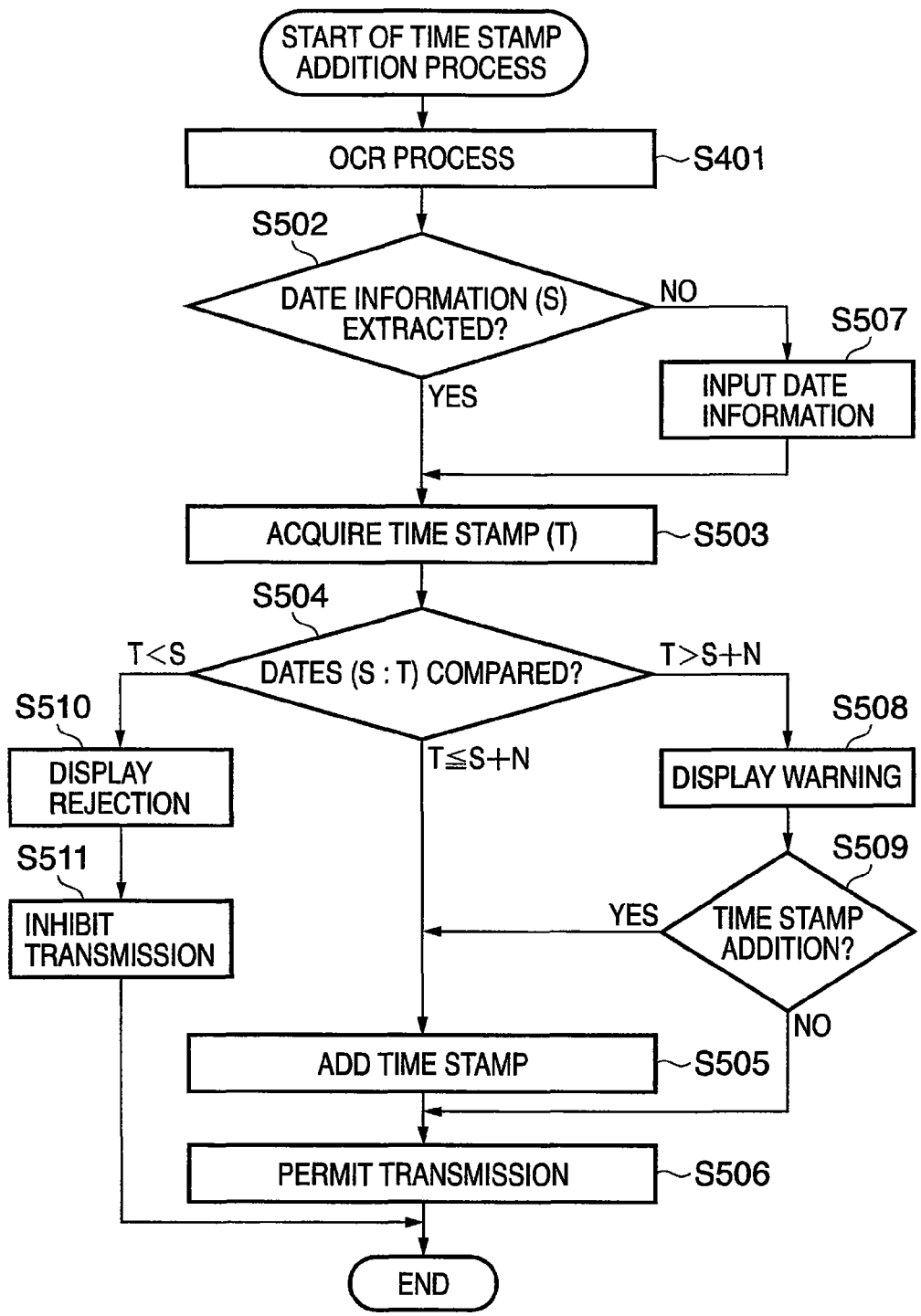
FIG. 8A is a flowchart showing details of a time stamp addition process in step S311a of the second embodiment of the present invention.

FIG. 8A is a flowchart showing details of the time stamp addition process in step S311a of the second embodiment of the present invention.

The same step numbers as in the flowchart of FIG. 6A of the first embodiment denote the same processes in FIG. 8A, and a detailed description thereof will be omitted.

In step S502, it is determined whether date information (S) is properly extracted in step S401. If the information is properly extracted (YES in step S502), the process advances to step S503. If the information is not properly extracted (NO in step S502), the process advances to step S507.

In step S507, a display unit 102 displays an input window to make the user input date information (S') equivalent to the date information (S) that should have been extracted automatically. Date information is input on the basis of a user operation on the input window.

In step S503, time stamp information (T) is acquired from a time stamp service server 30. The acquired time stamp information contains date information (T) of the time stamp decided by the time stamp service server 30. The detailed process is a known technique, and a description thereof will be omitted.

In step S504, the date information (S) extracted in step S401 or the date information (S') input in step S507 is compared with the time stamp information (T) acquired from the time stamp service server 30.

If T≦S+N holds in step S504 with respect to a term of legal validity (N) of the time stamp, the process advances to step S505. More specifically, if the time stamp information (T) indicates a date within the term of legal validity (N) from the date information (S) or (S'), it is determined that time stamp addition to the image data with the date information (S) or (S') is legally valid.

If T>S+N holds in step S504 with respect to the term of legal validity (N) of the time stamp set by the user, the process advances to step S508. More specifically, if the time stamp information (T) indicates a date outside the term of legal validity (N) from the date information (S) or (S'), it is determined that there is a possibility that time stamp addition to the image data with the date information (S) or (S') is legally invalid.

If T<S holds in step S504 with respect to the term of legal validity (N) of the time stamp set by the user, the process advances to step S510. More specifically, if the time stamp information (T) indicates a date earlier than the date information (S) or date information (S'), it is determined that the date information (S) or (S') is invalid.

If T≦S+N, in step S505, the time stamp acquired in step S503 is added to the image data added with the electronic signature in step S310. The process of adding a time stamp to image data is a known technique, and a description thereof will be omitted.

In step S506, a return value to permit transmission of the image data with the time stamp to the storage server 20 is generated and saved in the mass storage unit 106, and the process is ended. That is, the return value functions as a flag indicating the enable/disable state of image data saving in the storage server 20. In this case, a flat (return value) to permit saving is set.

Figure 8B:
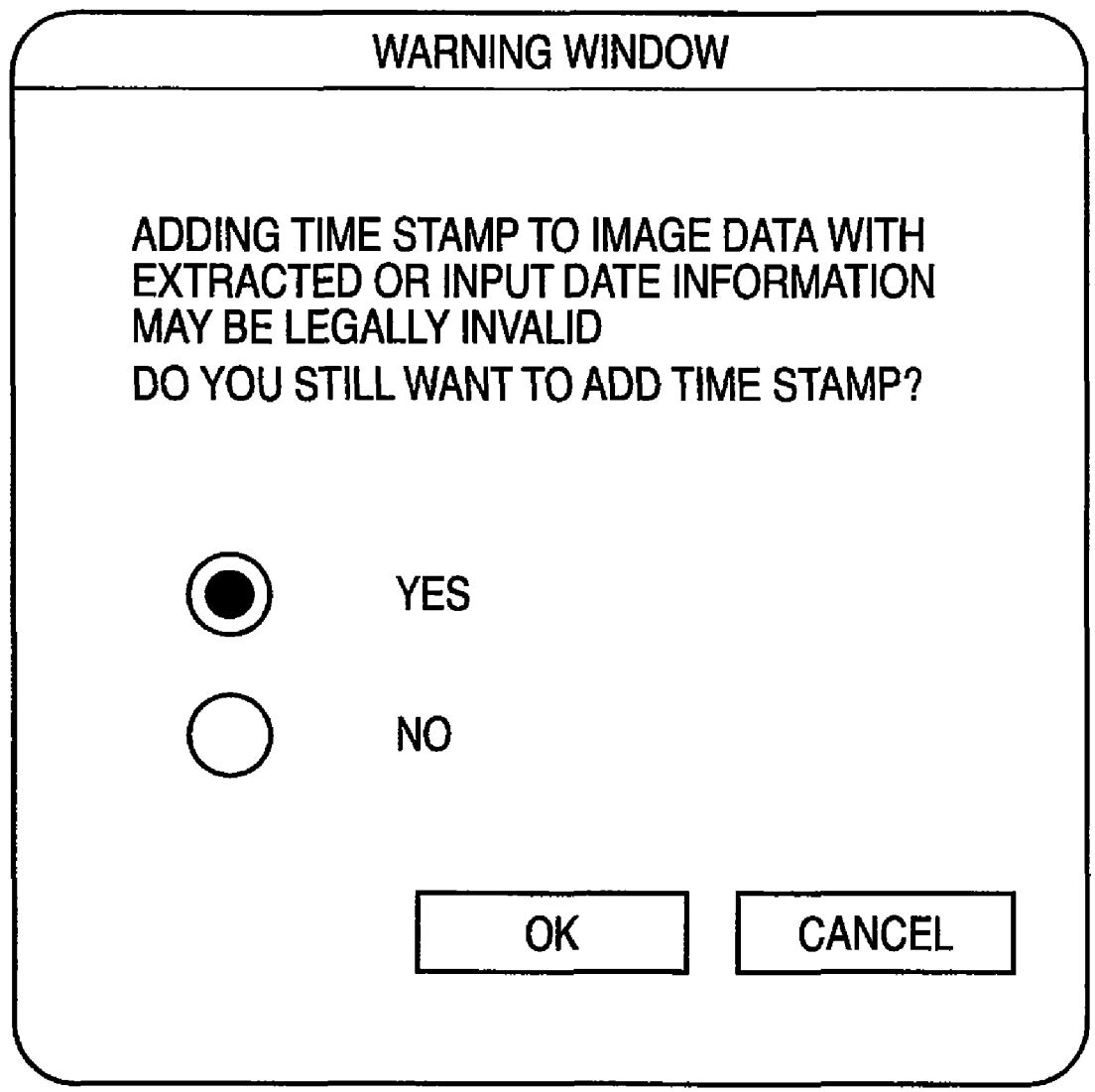
FIG. 8B is a view showing an example of a warning window according to the second embodiment of the present invention.

If T>S+N, in step S508, the display unit 102 displays a warning window (FIG. 8B) indicating that there is a possibility that time stamp addition to the image data with the date information (S) or (S') is legally invalid.

In step S509, the display unit 102 displays a selection window to make the user select whether to add a time stamp regardless of the possibility of legal invalidity. Whether to add a time stamp is determined on the basis of a user operation in the selection window. If time stamp addition is selected (YES in step S509), the process advances to step S505. If time stamp addition is not selected (NO in step S509), the process advances to step S506.

Even when time stamp addition is not selected in step S509, a return value to permit transmission of the image data without the time stamp to the storage server 20 is set for the process target image data.

Figure 8C:
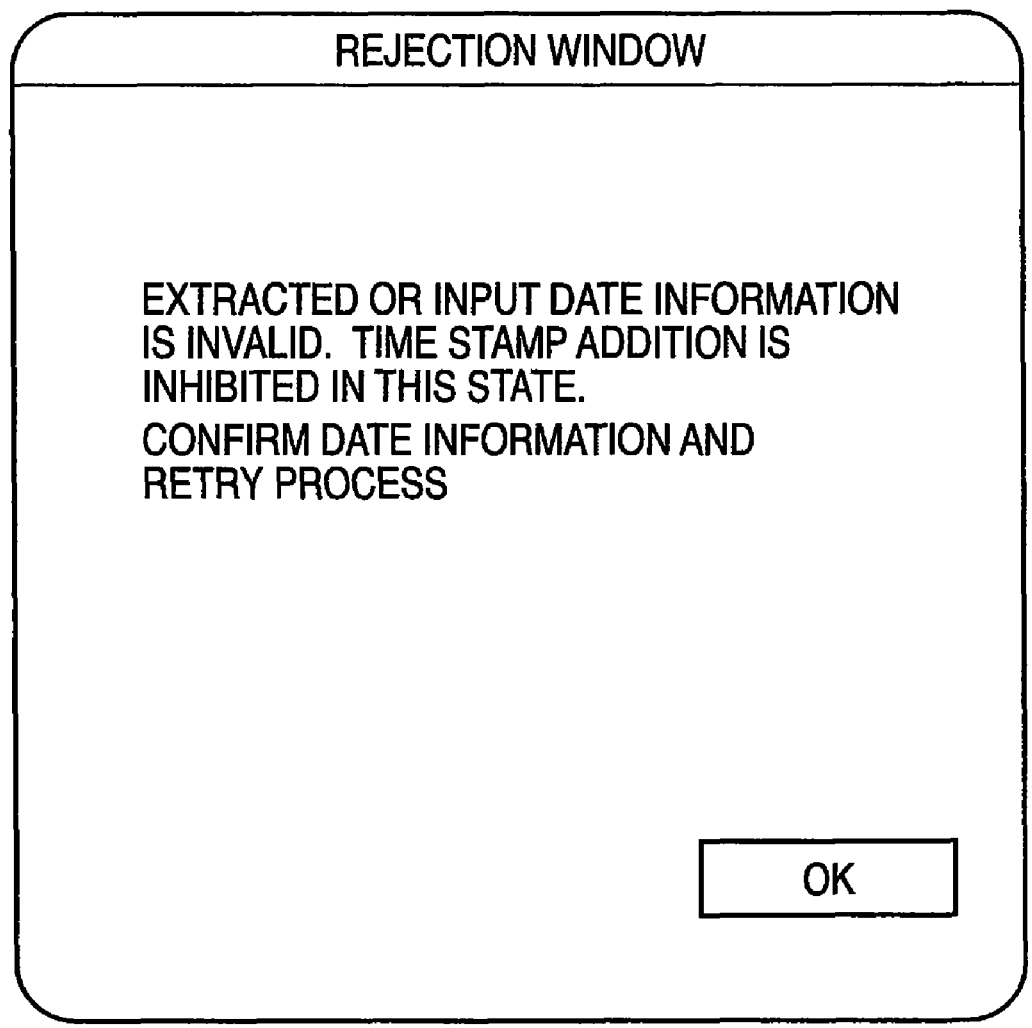
FIG. 8C is a view showing an example of a rejection window according to the second embodiment of the present invention.

If T<S, in step S510, the display unit 102 displays a rejection window (FIG. 8C) indicating that the date information (S) or (S') is invalid.

In step S511, a return value to inhibit transmission of the image data with the time stamp to the storage server 20 is generated and saved in the mass storage unit 106, and the process is ended. That is, in this case, a flag (return value) to inhibit saving is set.

The above-described arrangement can prevent image data with inconsistency or invalidity from being saved in the storage server 20.

As described above, according to the second embodiment, if a paper document whose legal validity may be denied because of the lapse of the predetermined period is to be digitized and added with a time stamp, the user is notified of it. This allows to minimize discard of originals.

If a paper document issue date is obviously inconsistent with a date indicated by a time stamp, it is possible to prevent time stamp addition to the electronic document with mismatching dates and document saving in the storage server.

Third Embodiment

In the first embodiment, save settings for image data can be done in association with document properties such as the index in step S203. In the third embodiment, document properties non-editable by the user can contain date information indicating whether the document satisfies legal validity.

Figure 9:
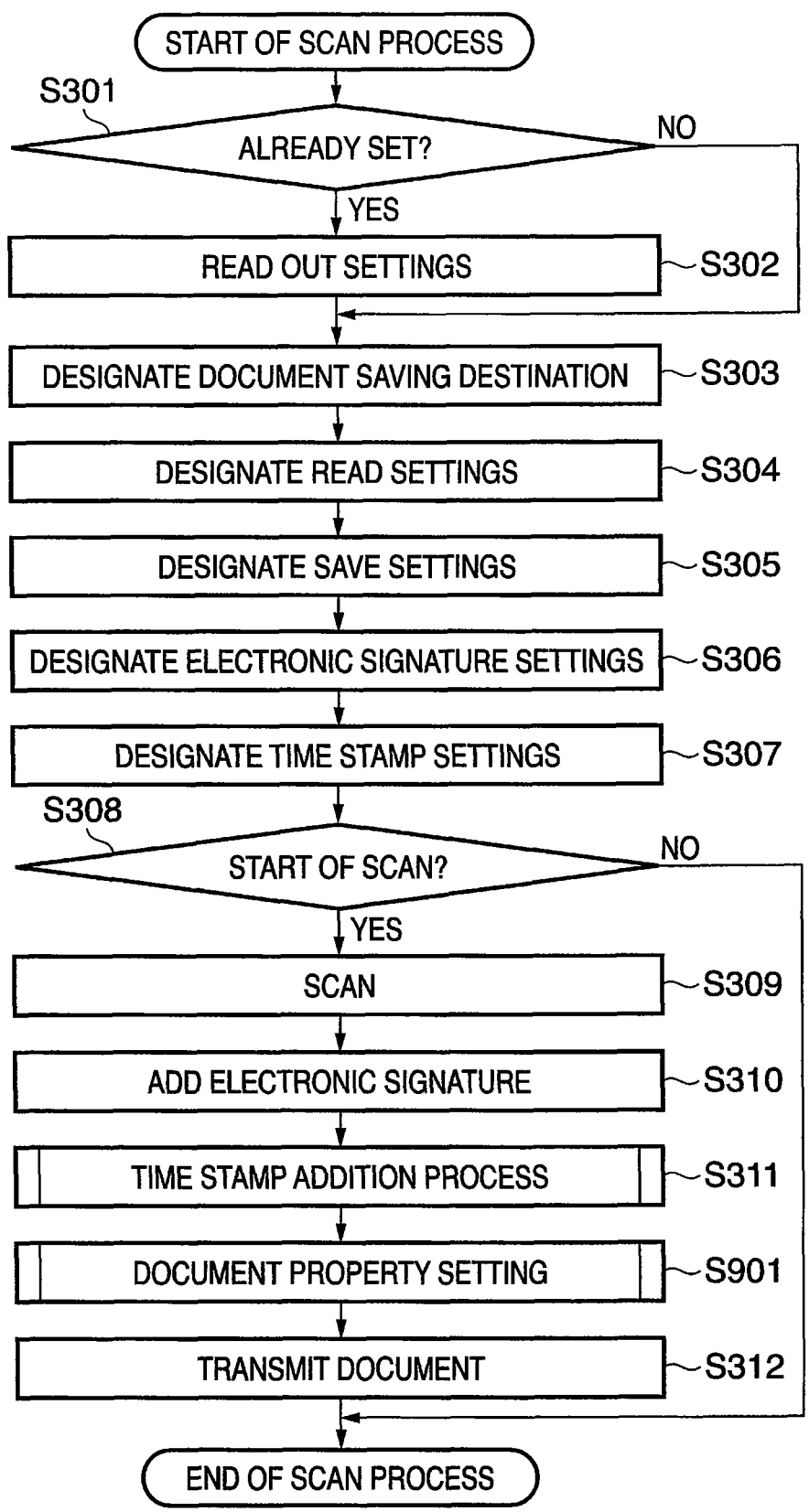
FIG. 9 is a flowchart showing details of a scan process according to the third embodiment of the present invention.
Figure 10:
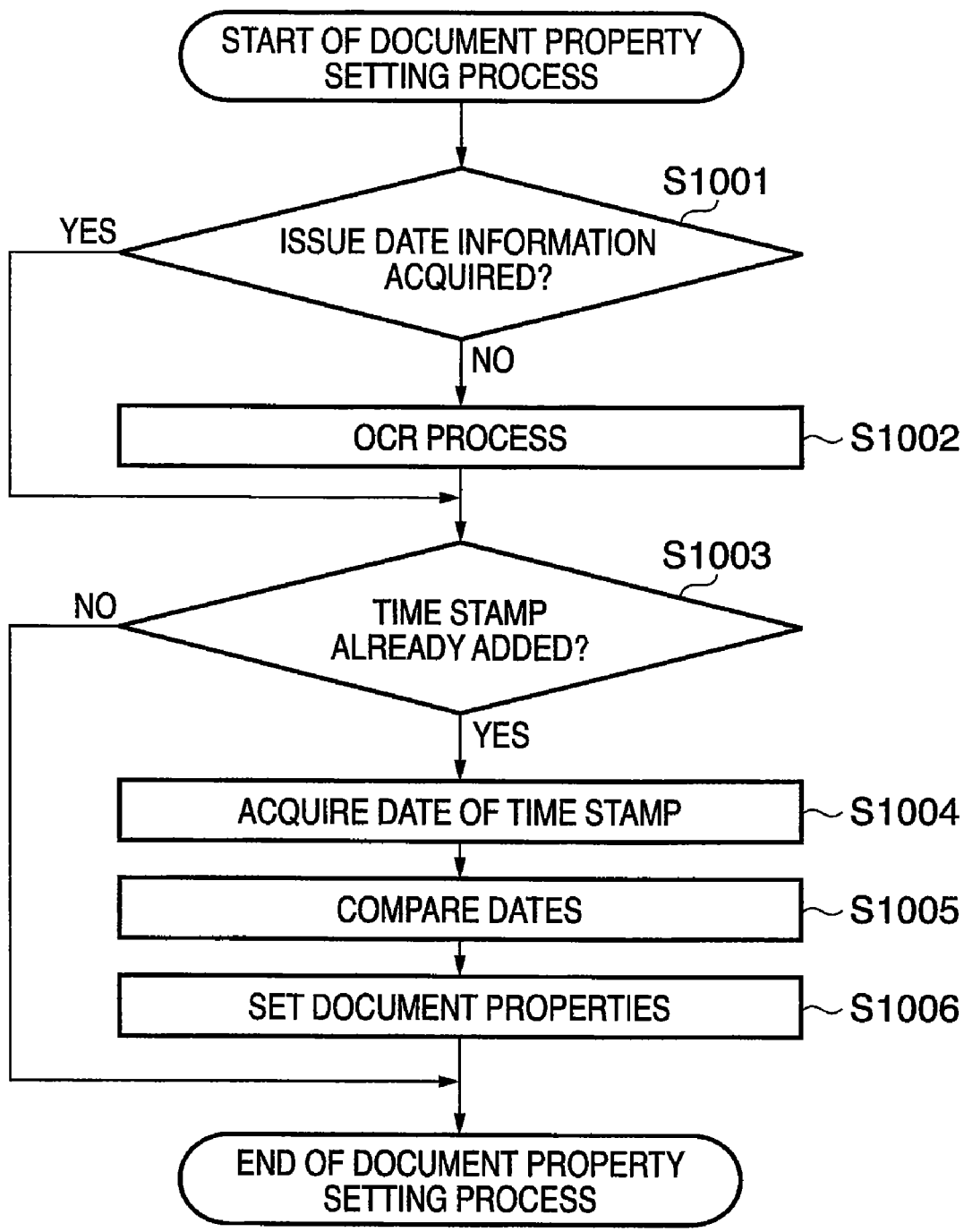
FIG. 10 is a flowchart showing details of a document property setting process.

FIG. 9 is a flowchart showing a scan process according to the third embodiment. In steps S301 to S312, the same process as in FIG. 5 is executed. In step S901, information to be set in the document properties is acquired and set. FIG. 10 shows details of step S901.

In step S1001, it is determined whether date information corresponding to the issue date is already acquired from the image data in step S402 in FIG. 6A. If the date information is not acquired yet, the OCR process is executed for the image data to acquire the date information in step S1002. In step S1002, the date information is acquired by executing the OCR process in the same way as in step S401 in FIG. 6A.

In step S1003, it is determined whether a time stamp is already added to the image data. If it is determined that a time stamp is already added, the process advances to step S1004.

If it is determined that no time stamp is added, the process is ended. The process is ended because this embodiment aims at setting information about the date in the document properties. However, the remaining document properties may be set automatically or manually.

In step S1004, date information is acquired from the time stamp added to the image data. The date information may contain not only a year/month/day but also a time.

In step S1005, the date information acquired in step S401 or S1002 is compared with the date information acquired in step S1004. In the third embodiment, the difference is calculated by "(value acquired in step S1004)–(value acquired in step S401 or S1002)". However, any other calculation may be done.

In step S1006, information to be set in the document properties is decided. Then, in step S312, the document properties to be transmitted to a storage server 20 together with the image data are set, and the document property setting process is ended. In the third embodiment, the date difference information calculated in step S1005 is set.

Information other than the result calculated in step S1005 may be set in the document properties simultaneously. For example, information about the user who has executed the scan or saving process may be set as an index. The contents of the text obtained by the OCR process of the document may be set as an index. The document properties may also contain setting of a marker that allows the user to recognize the target document from the document list at a glance, e.g., a document icon corresponding to the comparison result in step S1005.

Control is preferably done to store the document properties about date information in an area unchangeable by the user.

As described above, according to the third embodiment, in digitizing a paper document, the system can determine the date (or date/time) of issue of an audit target document and the date (or date/time) of digitization and set and save them as the properties of the digitized document without allowing intervention of the user. Hence, when document properties are searched for by using query "documents with a difference equal to or more than a predetermined period (e.g., on week)" at the time of audit, the user can search for documents whose time from the issuance to digitization is equal to or longer than the period. It is therefore possible to easily list documents with or without legal validity.

In the third embodiment, date information is saved as properties in digitizing a document. This largely speeds up the search process as compared to a "system which searches for a document by opening target document data upon document search, executing OCR for the image data to acquire the issue date, and comparing it with the date of time stamp".

In the third embodiment, the document property setting step is added to the first embodiment (flowchart in FIG. 5), as shown in FIG. 9. However, the present invention is not limited to this. That is, the document property setting step may be added to the second embodiment (FIG. 7).

Fourth Embodiment

The first to third embodiments are concerned with a document registration system including the MFP device 10, storage server 20, and storage server client 40. However, the present invention is not limited to this. For example, the embodiments are also applicable to a document registration system including a simple scanner device and a general personal computer.

The first to third embodiments are concerned with a time stamp service server complying with RFC3136. However, the present invention is not limited to this. In the present invention, not only the protocol complying with RFC3136 but any other protocol capable of implementing the same function can be used as the protocol to acquire a time stamp.

If date information extraction from the OCR result has failed in step S502 in FIG. 8A, the user inputs the date information manually in step S507. However, this input process is not indispensable because it is not directly relevant to the gist of the present invention.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-103629 filed on Apr. 4, 2006, which is hereby incorporated by reference herein in its entirety.

What is claimed is:

1. An image processing apparatus which manages image data read by an image reading unit, comprising:
    first acquisition means for executing an OCR process for the image data read by the image reading unit and acquiring first date information in the image data on the basis of the OCR process result;
    second acquisition means for acquiring second date information, the second date information indicating current date;
    comparison means for comparing the first date information acquired by said first acquisition means with the second date information acquired by said second acquisition means;
    addition means for adding time stamp information to the image data in a case that a comparison result of said comparison means indicates that a difference between the first date information and the second date information falls within a predetermined period; and
    saving means for saving the image data to which the time stamp information is added by said addition means, into a designated saving destination device.

2. The apparatus according to claim 1, further comprising display means for displaying, on a display unit, a confirmation window to confirm whether to add the time stamp information to the image data in a case that the comparison result of said comparison means indicates that the difference between the first date information and the second date information does not fall within the predetermined period.

3. The apparatus according to claim 2, wherein in a case that said first acquisition means has failed in acquiring the first date information, said display means displays, on the display unit, a confirmation window including display to indicate the failure and a control to instruct whether to add the time stamp information to the image data.

4. The apparatus according to claim 2, wherein in a case that a user gives the instruction to add the time stamp information by the confirmation window, said addition means adds the time stamp information to the image data, and said saving means saves the image data to which the time stamp information is added by said addition means into the designated saving destination device.

5. The apparatus according to claim 2, wherein
    said display means further displays, on the display unit, an input window for inputting a management number for managing the image data, and
    said saving means saves, in the designated saving destination device, the management number input via the input window in correspondence with the image data.

6. The apparatus according to claim 2, wherein in a case that a user gives the instruction not to add the time stamp information by the confirmation window, said saving means saves the image data without any time stamp information in the saving destination device.

7. The apparatus according to claim 6, further comprising display means for displaying, on a display unit, a confirmation window to confirm whether to add the time stamp information to the image data in a case that the comparison result of said comparison means indicates that the difference between the date information and the time stamp information does not fall within the predetermined period.

8. The apparatus according to claim 7, wherein in a case that the comparison result of said comparison means indicates that the difference between the date information and the time stamp information does not fall within the predetermined period, said display means displays, on the display unit, a confirmation window including display to indicate the comparison result and a control to confirm whether to add the time stamp information to the image data.

9. The apparatus according to claim 7, wherein in a case that said first acquisition means has failed in acquiring the date information, said display means displays, on the display unit, an input window including a control to input date information.

10. The apparatus according to claim 1, wherein said saving means further controls to save, in the saving destination device, information obtained by comparison calculation of the first date information and the time stamp information as information for searching of the image data.

11. An image processing apparatus which manages image data read by an image reading unit, comprising:
    first acquisition means for executing an OCR process for the image data read by the image reading unit and acquiring date information in the image data on the basis of the OCR process result;
    second acquisition means for acquiring time stamp information from a time stamp service server;
    comparison means for comparing the date information acquired by said first acquisition means with the time stamp information acquired by said second acquisition means;
    addition means for adding time stamp information to the image data in a case that a comparison result of said comparison means indicates that a difference between the date information and the time stamp information falls within a predetermined period; and saving means for saving the image data to which the time stamp information is added by said addition means, into a designated saving destination device.

12. The apparatus according to claim 11, wherein in a case that the comparison result of said comparison means indicates that the date information is later than the time stamp information, said display means displays, on the display unit, a confirmation window indicating that the date information is invalid.

13. The apparatus according to claim 11, further comprising setting means for setting a flag to inhibit saving of the image data in a case that it is determined on the basis of the comparison result of said comparison means that the date information is invalid.

14. The apparatus according to claim 11, wherein said saving means controls to save, in the saving destination device, information obtained by comparison calculation of the date information and the time stamp information as information for searching of the image data.

15. A control method of an image processing apparatus which manages image data read by an image reading unit, comprising:
   a first acquisition step of executing an OCR process for the image data read by the image reading unit and acquiring first date information in the image data on the basis of the OCR process result;
   a second acquisition step of acquiring second date information, the second date information indicating current date;
   a comparison step of comparing the first date information acquired in the first acquisition step with the second date information acquired in the second acquisition step;
   an addition step of adding time stamp information to the image data in a case that a comparison result of the comparison step indicates that a difference between the first date information and the second date information falls within a predetermined period; and
   a saving step of saving the image data to which the time stamp information is added by said addition means, into a designated saving destination device.

16. A control method of an image processing apparatus which manages image data read by an image reading unit, comprising:
   a first acquisition step of executing an OCR process for the image data read by the image reading unit and acquiring date information in the image data on the basis of the OCR process result;
   a second acquisition step of acquiring time stamp information from a time stamp service server;
   a comparison step of comparing the date information acquired in the first acquisition step with the time stamp information acquired in the second acquisition step;
   an addition step of adding time stamp information to the image data in a case that a comparison result of the comparison step indicates that a difference between the date information and the time stamp information falls within a predetermined period; and
   a saving step of saving the image data to which the time stamp information is added by said addition means, into a designated saving destination device.

17. A computer program stored in a non-transitory computer-readable medium to cause a computer to control an image processing apparatus which manages image data read by an image reading unit, comprising:
   a first acquisition step of executing an OCR process for the image data read by the image reading unit and acquiring first date information in the image data on the basis of the OCR process result;
   a second acquisition step of acquiring second date information, the second date information indicating current date;
   a comparison step of comparing the first date information acquired in the first acquisition step with the second date information acquired in the second acquisition step;
   an addition step of adding time stamp information to the image data in a case that a comparison result of the comparison step indicates that a difference between the first date information and the second date information falls within a predetermined period; and
   a saving step of saving the image data to which the time stamp information is added by said addition means, into a designated saving destination device.

18. A computer program stored in a non-transitory computer-readable medium to cause a computer to control an image processing apparatus which manages image data read by an image reading unit, comprising:
   a first acquisition step of executing an OCR process for the image data read by the image reading unit and acquiring date information in the image data on the basis of the OCR process result;
   a second acquisition step of acquiring time stamp information from a time stamp service server;
   a comparison step of comparing the date information acquired in the first acquisition step with the time stamp information acquired in the second acquisition step;
   an addition step of adding time stamp information to the image data in a case that a comparison result of the comparison step indicates that a difference between the date information and the time stamp information falls within a predetermined period; and
   a saving step of saving the image data to which the time stamp information is added by said addition means, into a designated saving destination device.

* * * * *